United States Patent Office 2,727,925
Patented Dec. 20, 1955

2,727,925

REMOVAL OF VOLATILE FATTY ACIDS FROM PHENOL

Joseph Walker and Norman W. Lambert, Crystal Lake, Ill., assignors to The Pure Oil Company, Chicago, Ill., a corporation of Ohio No Drawing. Application August 5, 1952,
Serial No. 302,805

3 Claims. (Cl. 260—621)

The present invention relates to a process for the separation of organic acids, especially volatile carboxylic acids, from phenolic solutions, and more particularly to an adsorption process for the removal of volatile organic acids from solution in non-aqueous phenol by liquid phase adsorption on a solid adsorbent material.

It is known that two or more liquid components in a mixture may be separated by adsorption on a solid material which exhibits a preferential attraction for one component over the other. In gaseous or vapor phase adsorptive techniques, the component having the highest boiling point will generally be adsorbed in preference to the lower boiling components present in the mixture. However, in liquid mixtures or liquid phase adsorption techniques, no infallible general rules have as yet been established by which one may predict the course of adsorption processes. H. G. Cassidy in his book entitled "Adsorption and Chromatography," volume V, published 1951, in considering the molecular aspects of adsorption, the relation of adsorption in chemical structure, and particularly the adsorption of fatty acids, confirms this by pointing out that theoretical rules of adsorption are often reversed due to conflicting competition within the environment concerned. Water may be readily adsorbed by a porous hydrophilic adsorbent, such as silica gel, from low molecular weight organic acid solutions, such as acetic acid solutions. Hydrophilic adsorbents will also remove acetic acid from solution in benzene; likewise, butyric acid from toluene or gasoline. A hydrophobic adsorbent, such as activated carbon, will under certain conditions remove carboxylic acids from aqueous solutions and in such processes the high molecular weight acids are generally the first adsorbed. Any rules that have been established by experimentation and that may be utilized to predict the course of any adsorption process are always subject to the particular solute and solvent concerned, the pH, the temperature, the amount of adsorbent per volume of adsorbate, and other environmental conditions. It is possible in some instances to fix certain of these conditions and thereby establish a criterion by which the course of a given liquid phase adsorption may be predicted upon molecular structure, differences in boiling points or densities, and length of hydrocarbon chain. Many exceptions are always found to exist when this is attempted. Dipole moment and polarity may serve as guides in one environment and drop into oblivion in another environment.

Hydrophilic adsorbents, such as silica gel, have been used to a great extent in many liquid phase adsorption processes. This adsorbent will remove phenols from thiophenols, naphthalenes from alkylated benzenes, color- and odor-imparting bodies from hydrocarbons, aromatics and olefins from paraffins and naphthenes. Aliphatic alcohols may be adsorbed from aliphatic mercaptans by using silica gel. A non-related adsorbent, such as activated carbon, is useful in removing normal paraffins from isoparaffins, certain poisons from mercaptans, and even fatty acids from their aqueous solution.

In view of the rather extensive and diffuse art available on adsorption in the liquid phase and the fact that the course of such processes in a given environment is not subject to any steadfast predictions, the present invention serves as a step in the direction of clarifying and simplifying adsorptive techniques in a particular environment. It has been found that volatile fatty acids or carboxylic acids may be selectively adsorbed from phenolic solutions using hydrophilic adsorptive materials in an environment in which the conditions are not conducive to the application of any of the rules of prediction aforementioned. This is true because the material adsorbed is present in very small quantities and the solute is a material which, under ordinary conditions, and the conditions imposed, has an affinity for the adsorbent.

Accordingly, it is a fundamental object of this invention to provide a process for the separation of organic acids from non-aqueous phenolic solutions.

Another object of this invention is to provide a process for separating the more volatile organic acids from solution in phenol.

Still another object of this invention is to provide a process for purifying non-aqueous phenol solutions containing small amounts of volatile organic acids, thereby rendering that phenol solution less corrosive to metal surfaces.

Substantially non-aqueous phenolic solutions are widely used for many extraction processes, especially in the petroleum field. Such solutions are widely used to refine lubricating oils to remove therefrom the highly aromatic materials which do not possess desirable lubricating properties. Such processes are ordinarily conducted using a countercurrent continuous liquid phase contacting system wherein the phenolic solution is continuously contacted with the lubricating oil fraction to be treated, separated from the oil, freed of its aromatic constituents, and continuously recycled to the process. As such a process is continued, there occurs an accumulation of organic acids including a small amount of more volatile carboxylic acids and some petroleum acids, as for example naphthenic acids, in the phenolic extraction solution. The continuous recirculating of this acid-containing phenolic solution through the system, and especially in those parts of the apparatus where elevated conditions of temperature and pressure are applied, causes a severe corrosion of the metal parts contacted. Numerous methods have been applied for overcoming this corrosion problem, including the use of alkali at one step in the process, the incorporation of ammonia or amines in the system, or modification of processing conditions to otherwise inhibit the action of the corrosive acids. Many of these remedial steps have met with considerable success. In the course of experimenting with these corrosive phenolic solutions, applicants have found that, contrary to expectations, the mere treatment of these solutions with adsorbent material serves to remove the volatile organic acids present. Such removal substantially reduces the corrosivity of the non-aqueous phenolic solution and has the advantage of simplicity as well as low cost.

The elimination of the corrosivity of non-aqueous phenolic solutions is not the main object of this invention, and the above is merely illustrative of one application to which the present invention may be used.

In order to demonstrate the invention, a series of experiments were conducted using as an example of the phenolic solution ordinary phenol and as an example of the volatile organic acid, acetic acid. A solution of phenol was prepared containing 0.0314 weight/volume per cent of acetic acid. Portions of this mixture were percolated through several glass columns containing different adsorbents. Each column was 24 inches in length and had a diameter of one inch. During the percolation of each sample through the columns, the column temperatures were maintained at about 150° F. under atmospheric conditions. Fractions of the effluent from the bottom of the columns were collected and subjected to analysis to determine their acetic acid content. The results are shown in the following table:

TABLE

*Removal of acetic acid from phenol by adsorption*

| Adsorbent | g. of Adsorbent per 100 g. of charge | Thruput Time for total charge at 150° F. (Min.) | Percent of Acetic Acid Removed |
|---|---|---|---|
| Silica gel | 9.44 | 372 | |
| Cut 1 | | | 32.2 |
| Activated Carbon | 2.788 | 312 | |
| Cut 1 (200 ml.) | | | 45.3 |
| Cut 2 (200 ml.) | | | 23.1 |
| Fuller's earth | 9.124 | 389 | |
| Cut 1 (200 ml.) | | | 86.9 |
| Cut 2 (200 ml.) | | | 87.3 |
| Activated alumina | 14.735 | 386 | |
| Run 1—Cut 2 (200 ml.) | | | 82.6 |
| Run 2—Cut 1 (200 ml.) | | | 81.5 |
| Run 2—Cut 2 (200 ml.) | | | 98.4 |

The silica gel and activated alumina used in the experiments conducted in the table above were 80–300 mesh and the activated carbon and fuller's earth were 30–80 mesh and 30–60 mesh, respectively. From the table it is seen that, on the basis of the total amount of acetic acid adsorbed, fuller's earth and activated alumina are somewhat superior to silica gel and activated carbon under the existing conditions. Based on the number of grams of adsorbent used per grams of charge in light of the amount of acetic acid removed, the fuller's earth and activated carbon are more efficient than silica gel and activated alumina. It is apparent from the table that by the use of a solid granular adsorbent, a phenol solution may be treated to effectively remove substantial percentages of low molecular weight organic acids. By the removal of from about 50 per cent to 98 per cent of the total acid content, there is produced an effluent which is substantially less corrosive.

Additional experiments were conducted using phenol solutions containing slightly smaller amounts of acetic acid in order to make a comparison of the naturally occurring clay-type adsorbent and a synthetic ion-exchange adsorbent of the amine-formaldehyde type. The following examples are illustrative of the results obtained.

*Example 1.*—A phenolic solution containing 0.028 weight/volume per cent of acetic acid was percolated through a 20-inch column packed with 30–80 mesh activated carbon at a temperature of 150° F. Analysis of the effluent revealed that 92.8 per cent of the acetic acid had been adsorbed.

*Example 2.*—A mixture of acid and phenol, as in Example 1, was percolated through a 24-inch column of 70–80 mesh silica gel under the same conditions. Analysis of the effluent revealed that 36.6 per cent of the acetic acid was adsorbed.

*Example 3.*—A 500 ml. solution of phenol containing 0.028 weight/volume per cent of acetic acid was agitated together with 10 grams of a synthetic resin comprising an amine-formaldehyde addition product, a proprietary product under the name of Amberlite IR–4B, for a period of five hours. The resin was separated from the mixture and an analysis of the filtrate revealed that 60.1 per cent of the acid had been removed.

The above experiments illustrate that synthetic ion-exchange resinous materials are effective in removing organic acids from phenolic solutions and that the effectiveness of such adsorbents is comparable to that of naturally occurring clay-type materials. In this regard, the adsorbent material used in the instant process may include active clays, fuller's earth, Attapulgus clays, Terrana clays, Floridin clays, silica gel, activated carbon, activated alumina, and other metal oxide adsorbent materials or mixtures thereof. The adsorption process may be conducted by contacting the non-aqueous phenolic, acid-containing mixture with the adsorbent with sufficient agitation to insure intimate contact therewith, and separating the adsorbent from the mixture by filtering, decanting, or centrifuging. Also, the process may be conducted by percolating the mixture to be treated through a column packed with the adsorbent material. Such percolation may be conducted on a continuous basis using two or more columns of adsorbent and subjecting one or more of the columns to regeneration by a desorbing liquid, such as methanol-benzene mixtures, or by the application of steam stripping, or heat while the other is on stream. A moving bed type operation and batch or continuous direct contact with agitation followed by settling and decanting may also be used.

The conditions under which the contacting method or percolation method is conducted are preferably in the liquid phase from above the melting point of the phenolic, organic acid-containing mixture to below the boiling point of said mixture. Temperatures from 110° F. to 175° F. are preferred but, where the phenolic solution contains no low boiling organic acids, temperatures up to 350° F. may be employed.

The present invention has been demonstrated by applying various adsorbents to non-aqueous phenolic solutions containing small amounts of acetic acid. These experiments have been merely illustrative of the invention which broadly applies to the adsorption of small amounts of organic acids, especially relatively volatile organic acids from solution in non-aqueous solutions of phenol or substituted phenols. Mono- and di-alkyl substituted mono- and di-hydric phenols may constitute the phenolic solution. In other words, the invention contemplates the removal of any volatile organic acid from solution in any non-aqueous solution which is essentially phenolic in nature. The organic acids contemplated include those acids having boiling points not substantially over that of phenol and having not more than six carbon atoms. Organic acids boiling between about 212° F. and 400° F. are ordinarily considered to be relatively volatile acids. These include formic, acetic, propionic, n-butyric, isobutyric, n-valeric, trimethylacetic, and caproic acids.

Carboxylic acids of the cyclopentane series, the so-called naphthenic acids, including petroleum naphthenic acids within the boiling range above mentioned, are included within the scope of the invention. These naphthenic acids may include, for example, 3-dimethyl-4-methyl-1-cyclopentyl-acetic, -butyric and -valeric acids. If present, such other organic acids are the sulfonic and disulfonic acids may be removed by the process of the invention.

By small amounts of these acids is meant not more than between about 0.01 to 1.0 weight per cent based on the total amount of phenol present in the solution. It is preferred that the phenolic solutions to be treated in accordance with this invention be non-aqueous; that is, water is not present in more than about 5 per cent by volume, since the presence of water may change the relative adsorbabilities of the organic acids in the presence of phenolic substances.

The conditions under which the volatile organic acids dissolved in phenolic solutions exhibit their corrosivity to metal surfaces are generally those of elevated temperatures and pressures. At temperatures above the boiling point of water and as high as 500° to 600° F. under atmospheric or superatmospheric pressures, which conditions may be imposing in the various heat exchangers, condensers, vaporizers, and the like used in refinery or other chemical operations wherein phenolic solutions of the type described are being employed, the volatile organic acids seem to exhibit their most active corrosion action. The present invention, therefore, has application where non-aqueous phenolic solutions are being employed under elevated temperatures and pressures and are exhibiting a volatile acid content and corresponding corrosion of the metal surfaces contacted. The types of metals which are subject to disintegration from organic acids under the conditions described include both ferrous and non-ferrous metals and their alloys. In general, the types of equipment in which corrosion has been found are steels and steel alloys and various types of iron, including cast iron.

What is claimed is:

1. The method of treating a non-aqueous phenol solution containing from about 0.01 to 1.0 weight/volume per cent of volatile organic carboxylic acids having boiling points between about 212° to 400° F. and rendering said solution substantially less corrosive to metal surfaces which comprises contacting said liquid phenol solution at a temperature above the melting point of phenol with a solid adsorbent selected from the group of fuller's earth, activated alumina and activated carbon and, separating the spent adsorbent from the phenol solution and removing an effluent having a substantially reduced content of said acids.

2. The method in accordance with claim 1 in which the organic acids separated are essentially acetic acid.

3. The method in accordance with claim 1 in which the adsorbent is activated alumina.

References Cited in the file of this patent

UNITED STATES PATENTS

| | | |
|---|---|---|
| 1,537,260 | Patrick | May 12, 1925 |
| 1,793,304 | Boyer | Feb. 17, 1931 |
| 2,124,171 | Story | July 19, 1938 |
| 2,375,596 | Strickland | May 8, 1945 |